(12) United States Patent
Gerrard et al.

(10) Patent No.: US 8,604,157 B2
(45) Date of Patent: Dec. 10, 2013

(54) CROSSLINKED BLENDS OF POLYPHENYLENE SULFIDE AND POLYPHENYLSULFONE FOR DOWNHOLE APPLICATIONS, METHODS OF MANUFACTURE, AND USES THEREOF

(75) Inventors: David P. Gerrard, Magnolia, TX (US); Jiaxiang Ren, Houston, TX (US); Ping Duan, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 99 days.

(21) Appl. No.: 13/303,688

(22) Filed: Nov. 23, 2011

(65) Prior Publication Data

US 2013/0131210 A1    May 23, 2013

(51) Int. Cl.
*C08G 75/00*    (2006.01)
(52) U.S. Cl.
USPC ........................................ 528/373
(58) Field of Classification Search
USPC ........................................ 528/373
See application file for complete search history.

(56) References Cited

U.S. PATENT DOCUMENTS

| | | | |
|---|---|---|---|
| 5,789,083 A | 8/1998 | Thomas | |
| 6,896,063 B2 | 5/2005 | Chang et al. | |
| 7,387,158 B2 | 6/2008 | Murray et al. | |
| 7,392,852 B2 | 7/2008 | Richard | |
| 8,048,348 B2 | 11/2011 | Duan et al. | |
| 2004/0138321 A1 | 7/2004 | Hashimoto et al. | |
| 2006/0051540 A1 | 3/2006 | Kagawa | |
| 2007/0072828 A1 | 3/2007 | Yoo | |
| 2007/0240877 A1 | 10/2007 | O'Malley et al. | |
| 2009/0084539 A1 | 4/2009 | Duan et al. | |
| 2010/0089565 A1 | 4/2010 | Duan et al. | |
| 2012/0305238 A1 | 12/2012 | Duan et al. | |
| 2013/0062049 A1 | 3/2013 | Ren et al. | |

FOREIGN PATENT DOCUMENTS

JP        9096186 A    4/1997

OTHER PUBLICATIONS

Hawkins, et al.; "Chemistry of the Cure of Poly(p-phenylene sulfide)"; Macromolecular, 9(2); pp. 189-194; (1976).
Mather, et al.; "Shape Memory Polymer Research"; Annu. Rev. Mater. Res.; 39; pp. 445-471; (2009).
Meng, et al.; "A Review of Shape Memory Polymer Composites and Blends"; Composites: Part A; 40; pp. 1661-1672; (2009).
Ren, et al.; "Development and Characterization of an Elastomeric Material for High-Pressure and High-Temperature Downhole Sealing Applications"; Presentation at 2011 World Oil HPHT Drilling and Completion Conference; Abstract Date Mar. 11, 2011; only one page.

*Primary Examiner* — Terressa Boykin
(74) *Attorney, Agent, or Firm* — Cantor Colburn LLP

(57) ABSTRACT

A composition includes a crosslinked product of a polyphenylene sulfide and a polyphenylsulfone. A method for the manufacture of the crosslinked product of a polyphenylene sulfide and a polyphenylsulfone includes heating the polyphenylene sulfide and the polyphenylsulfone in presence of a crosslinking agent at a temperature and for a time effective to form the crosslinked product of polyphenylene sulfide and polyphenylsulfone.

43 Claims, 6 Drawing Sheets

CROSSLINKED BLENDS OF POLYPHENYLENE SULFIDE AND POLYPHENYLSULFONE FOR DOWNHOLE APPLICATIONS, METHODS OF MANUFACTURE, AND USES THEREOF

BACKGROUND

In downhole drilling and completion (for example gas and oilfield exploration and production, carbon dioxide sequestration, etc.) elastomers are used in applications as diverse as packer elements, blow out preventer elements, O-rings, gaskets, and the like. The elastomers are often exposed to high temperatures and harsh chemical and mechanical subterranean environments that can degrade elastomer performance over time, reducing their reliability.

An elastomer having good chemical resistance maintains its mechanical properties, for example elasticity, extrusion resistance, and integrated structural strength, when it is contacted with various chemicals. In downhole drilling and completion applications, these chemicals include various corrosive water- and oil-based downhole fluids. Thus, in the oil and gas industry, it is more important for an elastomer to maintain its mechanical properties under "wet" rather than under "dry" conditions at given temperature and service time.

High temperature polymers that are chemically resistant under dry conditions alone are readily available. Such polymers include certain thermoplastic polyimides (TPI) and polybenzimidazoles (PBI). Chemically resistant polymers useful under wet conditions at low temperature are also readily available. Examples of these polymers include certain polyethylenes and polypropylenes. Under conditions of high temperature and corrosive fluids, fluoropolymers are often used, as they are generally considered to have the best thermal stability and chemical resistance. Examples of fluoropolymers include polytetrafluoroethylene, and certain other fluoroelastomers and perfluoroelastomers. Certain grades of fluoropolymers are claimed to have a maximum continuous service temperature of 327° C. However, even the best perfluoroelastomers can become soft at high temperature over time, losing their capability to seal gaps under high pressure. Also, fluoroelastomers or perfluoroelastomers tend to develop cracks when contacted with various downhole fluids at high temperature.

Other types of polymers such as polyetheretherketone (PEEK) have been widely used in the downhole environment as backup rings. These polymers are rigid semi-crystalline thermoplastics and can withstand high heat and exposure to caustic chemicals. However, these polymers lack elasticity and they are not desirable to be used as sealing materials. Furthermore, it is found that these polymers tend to become brittle and break apart when contacted with various corrosive downhole fluids at high temperature.

Materials having improved chemical resistance, particularly at high temperatures and under wet conditions as well as devices made of such materials that solve the above issues would be well-received in the art.

BRIEF DESCRIPTION

A composition comprises a crosslinked product of a polyphenylene sulfide and a polyphenylsulfone.

A method for the manufacture of the crosslinked product of a polyphenylene sulfide and a polyphenylsulfone, the method comprising: heating the polyphenylene sulfide and the polyphenylsulfone in presence of a crosslinking agent at a temperature and for a time effective to form the crosslinked product of polyphenylene sulfide and polyphenylsulfone.

A downhole article comprises a crosslinked product of a polyphenylene sulfide and polyphenylsulfone.

A method of forming a downhole article, the method comprises forming a preform of the downhole element comprising a polyphenylene sulfide and polyphenylsulfone; and heating the preform at a temperature and for a time in presence of a crosslinking agent effective to crosslink the polyphenylene sulfide with the polyphenylsulfone to provide the article.

A method of forming a downhole article comprises forming particles comprising the crosslinked product of a polyphenylene sulfide and a polyphenylsulfone; and shaping the particles to provide the article.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
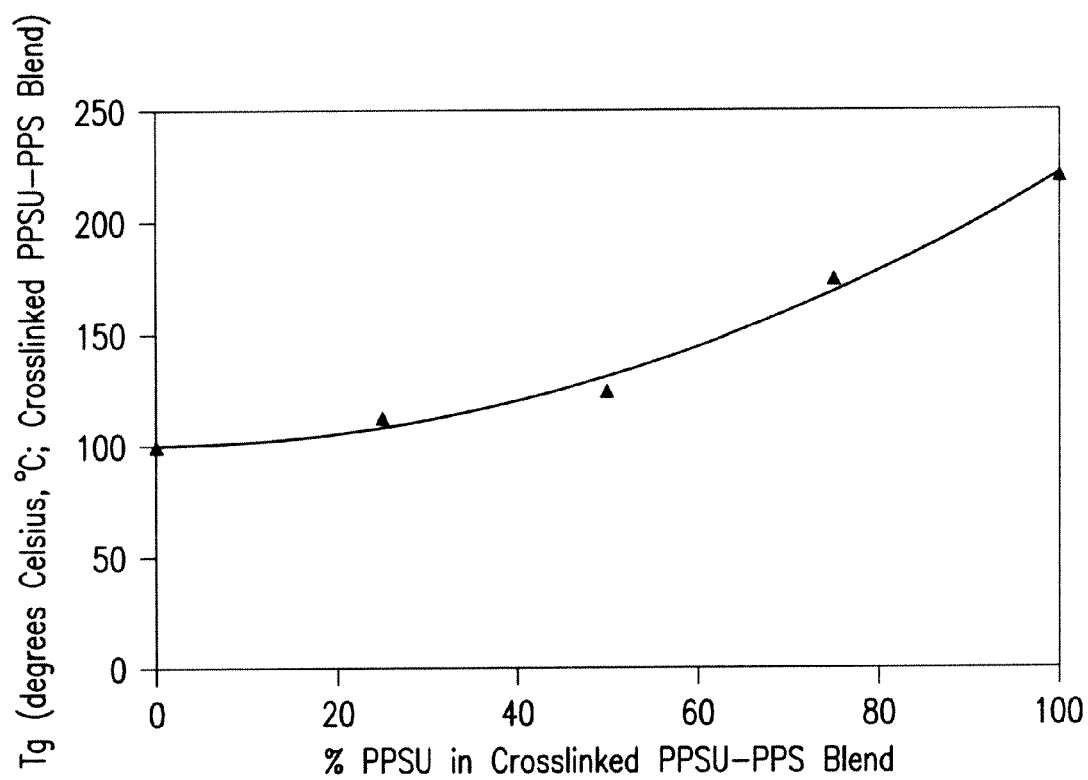
FIG. 1 shows a graph of glass transition temperature Tg (degrees Celsius, ° C.) versus the weight percent of PPSU in a crosslinked PPS-PPSU composition.
Figure 2A:
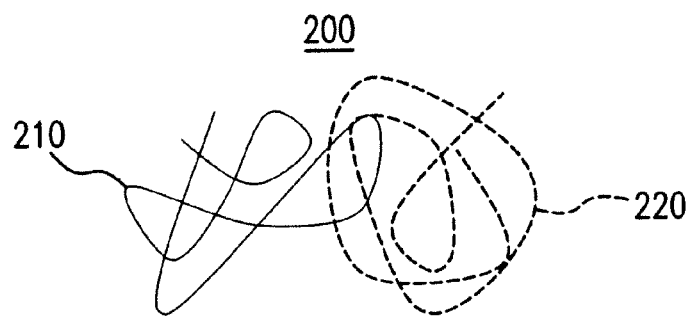
FIG. 2 show the effect of crosslinking on the miscibility of PPS and PPSU.
Figure 2B:
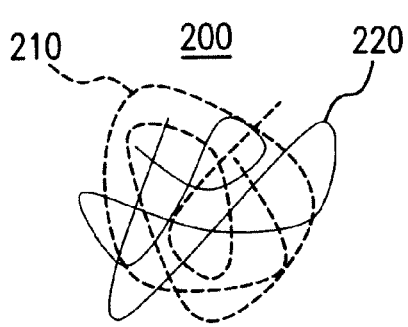
Figure 2C:
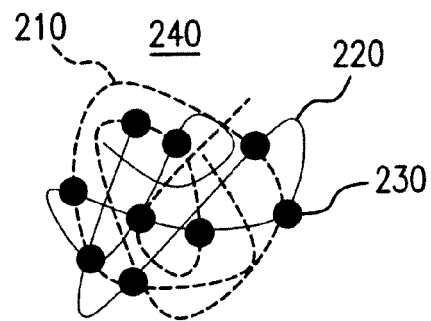
Figure 2D:
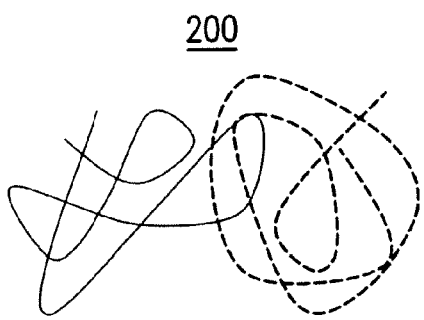
Figure 2E:
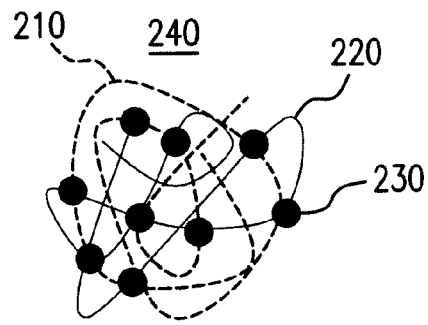

A detailed description of one or more embodiments of the disclosed apparatus and method are presented herein by way of exemplification and not limitation with reference to the Figures.

Described herein is a new method for the manufacture of high temperature elastomers from amorphous high temperature thermoplastics such as polyphenylene sulfide and polyphenylsulfone. These new high temperature elastomers are rigid and tough at room temperature, but behave as rubbery materials at temperatures above room temperature. The new elastomers have excellent elasticity, extrusion resistance, and integrated structural strength at high temperatures. In a particularly advantageous feature, the elastomers have improved chemical resistance under wet conditions, maintaining their excellent properties even under continuous use downhole.

The methods described herein produce an elastomer having a glass transition temperature (Tg) that is greater than room temperature but lower than the minimal application temperature (MAT) of the elastomer. Thus, the elastomers are more similar to engineering plastics (rigid and strong) below the MAT, but elastomeric above the MAT. Candidates for new high temperature elastomers are therefore not limited to those polymers within the traditional classifications of elastomer materials.

Potential materials for the manufacture of the high temperature elastomers include amorphous thermoplastic polymers that are capable of being molecularly crosslinked. Molecular chains of amorphous thermoplastic polymers behave like "random coils." After crosslinking, the coils tend to deform proportionally in response to an outside-applied force, and upon release of the outside-applied force, the coils tend to recover to their original configuration. In contrast, molecular chains of crystalline or semi-crystalline polymers are regularly aligned with each other. Outside-applied force tends to destroy molecular regularity and thus generate permanent deformation, especially when the materials are subjected to constant or high stretching/deformation. The degree of molecular crosslinking of the amorphous thermoplastic polymers can be adjusted based on the material selected and the intended use of the high temperature elastomer. In an embodiment, the degree of crosslinking is low, so as to provide optimal elasticity. If the degree of crosslinking is high, rigidity and/or brittleness of the high temperature elastomer can increase.

Accordingly, there is provided in an embodiment a thermally crosslinked product of polyphenylene sulfide and polyphenylsulfone, which is useful as a high temperature elastomer in downhole and completion applications. In an embodiment, the high temperature elastomer is manufactured by heating a powdered combination of a polyphenylene sulfide and polyphenylsulfone in the presence of a crosslinking agent to a high temperature, such as at or above the glass transition temperature (Tg) of the polyphenylene sulfide and above the activation temperature for crosslinking the two polymers. In an embodiment, the heating can be from about 300° C. to about 375° C., for example, inside an oven for at least 8 hours. The polyphenylene sulfide becomes crosslinked to the polyphenylsulfone via, for example, a vulcanization or oxidization process. The crosslinking agent can be sulfur, a peroxide, a metal oxide, or a sulfur donor agent, for example.

In an embodiment, a composition includes the crosslinked product of a polyphenylene sulfide and a polyphenylsulfone. That is, in the crosslinked product, the polyphenylene sulfide is crosslinked to the polyphenylsulfone.

The polyphenylene sulfide used for crosslinking to the polyphenylsulfone comprises repeating units of formula (1)

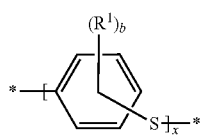

Formula (1)

wherein
R1 is a substituent on the phenyl group, wherein each R1 is independently hydrogen, halogen, C1-C20 alkyl group, C1-C20 alkoxy group, C1-C20 haloalkyl group, C3-C20 cycloalkyl group, C2-C20 heterocycloalkyl group, C3-C20 cycloalkyloxy group, C3-C20 aryl group, C3-C20 aralkyl group, C3-C20 aryloxy group, C3-C20 aralkyloxy group, C2-C20 heteroaryl group, C2-C20 heteroaralkyl group, C2-C20 alkenyl group, C2-C20 alkynyl group, amine group, amide group, alkyleneamine group, aryleneamine group, alkenyleneamine group, nitro, cyano, carboxylic acid or a salt thereof, phosphonic acid or a salt thereof, or sulfonic acid or a salt thereof;
b is an integer from 0-4, provided that the valence of the phenyl group is not exceeded; and
x is greater than about 10.

Each repeating unit can have a different or same attachment position of the sulfur atom to the phenyl ring in the repeating unit of formula (1). In addition, each unit can have a different pattern of substitution on the phenyl groups, for example a combination of units that is unsubstituted (b=0) and units that are substituted (b>0).

In a specific embodiment, the polyphenylene sulfides used for crosslinking are polyphenylene sulfides of formula (2)

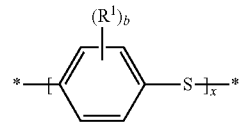

Formula (2)

wherein
each R1 is the same or different, and is as defined in formula (1),
b is as defined in formula (1), and
x is as defined in formula (1).

In an embodiment, each $R^1$ is the same or different, and is a linear or branched C1-C10 alkyl, linear or branched C2-C10 alkenyl, linear or branched C2-C10 alkynyl, C6-C18 aryl, C7-C20 alkylaryl, C7-C20 arylalkyl, C5-C10 cycloalkyl, C5-C20 cycloalkenyl, linear or branched C1-C10 alkylcarbonyl, C6-C18 arylcarbonyl, halogen, nitro, cyano, carboxylic acid or a salt thereof, phosphonic acid or a salt thereof, or sulfonic acid or a salt thereof.

In another embodiment each $R^1$ is the same or different, and is a linear or branched C1-C6 alkyl, C6-C12 aryl, C7-C13 alkylaryl, C7-C13 arylalkyl, linear or branched C1-C6 alkylcarbonyl, C6-C12 arylcarbonyl, C7-C13 alkylarylenecarbonyl, C7-C13 arylalkylene carbonyl, halogen, nitro, cyano, carboxylic acid or a salt thereof, phosphonic acid or a salt thereof, or sulfonic acid or a salt thereof, and b is an integer from 0 to 4, specifically 0 to 3, 0 to 2, or 0 to 1.

In another embodiment each $R^1$ is the same or different, and is a linear or branched C1-C6 alkyl, C6-C12 arylcarbonyl, or halogen, and b is an integer from 0 to 4, specifically 0 to 3, 0 to 2, or 0 to 1.

The polyphenylene sulfides can be linked through the meta, para, or ortho positions in the backbone of the polyphenylene sulfide. In an embodiment, the polyphenylene sulfide is of formula (3)

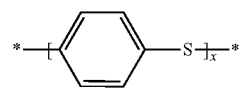

Formula (3)

wherein x is as defined in formula (2). Here, the sulfur atom attaches to the para position of the phenyl ring, and the phenyl ring has a full complement of hydrogen atoms, i.e., $R^1$ is hydrogen, and b is 4.

The linking of the unsubstituted phenylene sulfide units can be at least 90%, at least 95%, or 99% para, with the remaining linkages being ortho or meta. In an embodiment, the polyphenylene sulfides are linked at the para positions on the unsubstituted phenylene. In a further embodiment, the polyphenylene sulfides are linked at a combination of para, ortho, and meta positions on the substituted phenylene as shown in formula (1).

The polyphenylene sulfides can be linear or branched, having 1 or more, 2 or more, or 5 or more branching points per 1,000 carbon atoms along the polymer chain. In an embodiment, the polyphenylene sulfides are linear, having 10 or fewer, 5 or fewer, 2 or fewer, or 1 or fewer branching points per 1,000 carbon atoms along the polymer chain. The thermoplastic polymer can be obtained and used in either pellet or powder form.

In an embodiment, the polyphenylene sulfides for crosslinking have a glass transition temperature (Tg) of about 70 to about 150° C. when not crosslinked to the polyphenylsulfones.

The polyphenylene sulfides for crosslinking can further have a weight average molecular weight (Mw) of about 500 to about 100,000 grams/mole (g/mol), specifically about 1,000 to about 75,000 g/mol, more specifically about 1,500 to about 50,000 g/mol, and still more specifically about 2,000 to about 25,000 g/mol.

The polyphenylene sulfides for crosslinking are further characterized by relatively high tensile strength and Young's modulus (stiffness), as well as ductile mechanical deformation behavior. The polyphenylene sulfides can have a tensile yield strength of 8,000 to 25,000 psi (110 to 172 MPa), and a tensile modulus of 400 to 900 KPsi (3.4 to 6.2 GPa), and a tensile elongation of 1%, 5%, 7%, 8%, or higher. The polyphenylene sulfides for crosslinking can further have a compressive strength greater than 15,000 psi (103 MPa).

A combination of different polyphenylene sulfides can be used for crosslinking, for example polyphenylene sulfides of different molecular weights, different substitution patterns, different viscosities, and/or different degrees of branching.

Exemplary polyphenylene sulfides that can be used include those that are available from sources such as Chevron Phillips Chemical Company, Fortron Industries, and GE Plastics. Commercial grades of polyphenylene sulfides include those with the trade names PRIMEF®, RYTON®, FORTRON®, and SUPEC®.

According to an embodiment, the polyphenylene sulfide described above is crosslinked to polyphenylsulfone to form a crosslinked product.

The polyphenylsulfone used for crosslinking to the polyphenylene sulfide comprises repeating units of formula (4)

wherein
each $R^2$, $R^3$, $R^4$, $R^5$ are independently —O— or —SO$_2$—, wherein at least one of $R^2$ to $R^5$ is —SO$_2$—, and at least one of $R^2$ to $R^5$ is —O—;

each $R^6$, $R^7$, and $R^8$ is a substituent on a phenyl group, and each $R^6$, $R^7$, and $R^8$ is independently hydrogen, halogen, alkyl group, alkoxy group, haloalkyl group, cycloalkyl group, heterocycloalkyl group, cycloalkyloxy group, aryl group, aralkyl group, aryloxy group, aralkyloxy group, heteroaryl group, heteroaralkyl group, alkenyl group, alkynyl group, amine group, amide group, alkyleneamine group, aryleneamine group, or alkenyleneamine group, nitro, cyano, carboxylic acid or a salt thereof, phosphonic acid or a salt thereof, or sulfonic acid or a salt thereof;

c, d, and e are integers which are each independently 0-4, provided that the valence of the phenyl group is not exceeded;

p and q are integers which are independently 0 or 1; and r is an integer which is greater than about 10.

Each repeating unit of formula (4) can have a different or same attachment position of the substituents $R^6$, $R^7$, and $R^8$ on the phenyl ring. In addition, each unit can have a different pattern of substitution on the phenyl groups, for example a combination of units that is unsubstituted (c=d=e=0) and units that are substituted (at least one of c, d, b being greater than zero).

In an embodiment, each $R^6$, $R^7$, and $R^8$ is the same or different, and is a linear or branched C1-C10 alkyl, linear or branched C2-C10 alkenyl, linear or branched C2-C10 alkynyl, C6-C18 aryl, C7-C20 alkylaryl, C7-C20 arylalkyl, C5-C10 cycloalkyl, C5-C20 cycloalkenyl, linear or branched C1-C10 alkylcarbonyl, C6-C18 arylcarbonyl, halogen, nitro, cyano, carboxylic acid or a salt thereof, phosphonic acid or a salt thereof, or sulfonic acid or a salt thereof.

In another embodiment each $R^6$, $R^7$, and $R^8$ is the same or different, and is a linear or branched C1-C6 alkyl, C6-C12 aryl, C7-C13 alkylaryl, C7-C13 arylalkyl, linear or branched C1-C6 alkylcarbonyl, C6-C12 arylcarbonyl, C7-C13 alkylarylenecarbonyl, C7-C13 arylalkylene carbonyl, halogen, nitro, cyano, carboxylic acid or a salt thereof, phosphonic acid or a salt thereof, or sulfonic acid or a salt thereof, and each c, d, and e is an integer from 0 to 4, specifically 0 to 3, 0 to 2, or 0 to 1.

In another embodiment each $R^6$, $R^7$, and $R^8$ is the same or different, and is a linear or branched C1-C6 alkyl, C6-C12 arylcarbonyl, or halogen, and each c, d, and e is an integer from 0 to 4, specifically 0 to 3, 0 to 2, or 0 to 1.

In a specific embodiment, the polyphenylsulfone used for crosslinking to the polyphenylene sulfide includes at least 50

Formula (4)

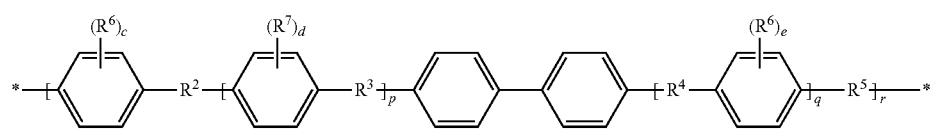

wt. % of a first repeating unit of formula (5), based on the weight of the polyphenylsulfone Formula (5)

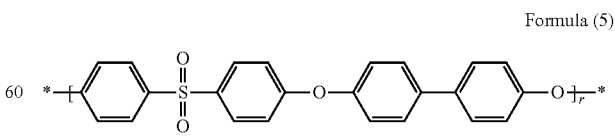

wherein r is an integer greater than about 10.

In another embodiment, the polyphenylsulfone includes a second repeating unit of formula (6), formula (7), formula (8), formula (9), or a combination thereof

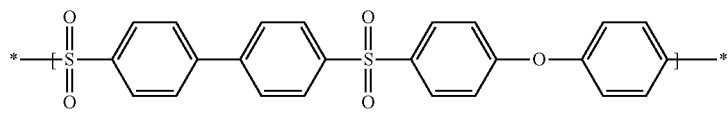

Formula (6)

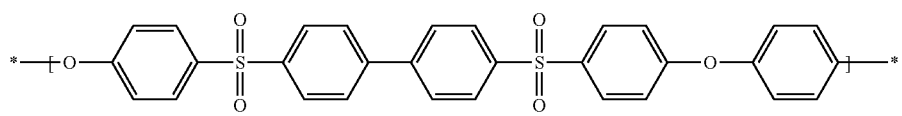

Formula (7)

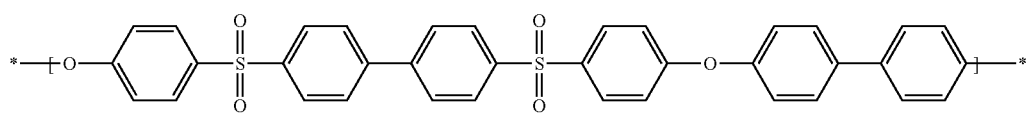

Formula (8)

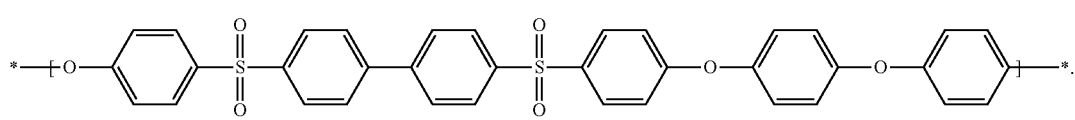

Formula (9)

In a further embodiment, the polyphenylsulfone is a copolymer of formula (5) and formula (10), formula (11), formula (12), or a combination thereof

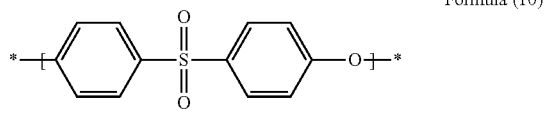

Formula (10)

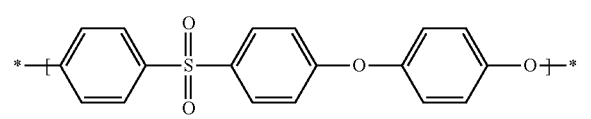

Formula (11)

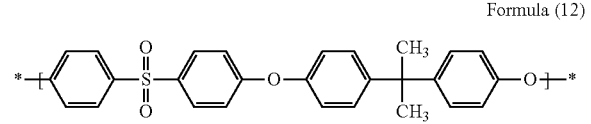

Formula (12)

The polyphenylsulfones contain 50% or more, 85% or more, 90% or more, 95% or more, or 99% or more of the units of formula (5) based on the total number of repeat units in the polymers. Other units that can be present. According to an embodiment, the polyphenylsulfone is a copolymer of at least 50% of formula (5) and one or more of formula (6), formula (7), formula (8), formula (9), formula (10), formula (11), formula (12), or a combination thereof.

The polyphenylsulfones can be linear or branched, having 1 or more, 2 or more, or 5 or more branching points per 1,000 carbon atoms along the polymer chain. In an embodiment, the polyphenylsulfones are linear, having 10 or fewer, 5 or fewer, 2 or fewer, or 1 or fewer branching points per 1,000 carbon atoms along the polymer chain. The thermoplastic polymer can be obtained and used in either pellet or powder form.

In an embodiment, the polyphenylsulfones for crosslinking with the polyphenylene sulfides have a glass transition temperature (Tg) of greater than about 175° C. when not crosslinked to the polyphenylsulfones, specifically from about 200° C. to about 280° C., and more specifically from about 255° C. to about 275° C.

The polyphenylsulfones for crosslinking can further have a weight average molecular weight (Mw) of about 500 to about 100,000 grams/mole (g/mol), specifically about 1,000 to about 75,000 g/mol, more specifically about 1,500 to about 50,000 g/mol, and still more specifically about 2,000 to about 25,000 g/mol.

The polyphenylsulfones for crosslinking are further characterized by relatively high tensile strength and Young's modulus (stiffness), as well as ductile mechanical deformation behavior. The polyphenylsulfones can have a tensile yield strength of 10152 to 21,755 psi (70 to 150 MPa), a tensile modulus of 315 to 500 KPsi (2.2 to 3.5 GPa), and a tensile elongation of 5%, 7%, 8%, or higher. The polyphenylsulfones for crosslinking can further have a compressive strength greater than 14,350 psi (98 MPa).

A combination of different polyphenylsulfones can be used for crosslinking, for example polyphenylsulfones of different molecular weights, different substitution patterns, different viscosities, and/or different degrees of branching.

Exemplary polyphenylsulfones that can be used include those that are available from sources such as Solvay Specialty Polymers, Quadrant EPP, Centroplast Centro, Duneon, GEHR Plastics, Westlake Plastics, and Gharda Chemicals. Commercial grades of polyphenylsulfones include those with the trade names RADEL®, UDEL®, ULTRASON®, and GAFONE®.

According to an embodiment, the polyphenylene sulfide is crosslinked to the polyphenylsulfone in a method that includes heating the polyphenylene sulfide and polyphenylsulfone in presence of a crosslinking agent at a temperature and for a time effective to form the crosslinked product of polyphenylene sulfide and polyphenylsulfone. That is, the crosslinked product includes crosslinks between the polyphenylene sulfide and the polyphenylsulfone. It should be appreciated that although the process forms crosslinks between the polyphenylene sulfide and the polyphenylsulfone, that each of the polyphenylene sulfide and polyphenylsulfone can also contain crosslinks. Further, these crosslinks in either of the polymers can be present before or after the process of crosslinking together the polyphenylene sulfide and polyphenylsulfone.

In an embodiment, heating the polyphenylene sulfide and polyphenylsulfone includes increasing the temperature to greater than the melting temperature (Tm) of the polyphenylene sulfide. The temperature is increased so as to reach or surpass the activation temperature for crosslinking to occur, for example, a temperature from about 300° C. to about 400° C. After a desired degree of crosslinking is obtained, i.e., after the time effective to form the crosslinked product passes, the crosslinked product can be cooled to, for example, room temperature.

As described above, the high temperature elastomers, in particular the crosslinked polyphenylene sulfide and polyphenylsulfone, are prepared by crosslinking in the presence of a molecular crosslinking agent. Crosslinking agents include gas, solid, or liquid crosslinking agents such as peroxides, sulfur, metal oxides, or sulfur donor agents.

Peroxides can be used for crosslinking, for example organic peroxides such as ketone peroxides, diacyl peroxides, dialkyl peroxides, peroxyesters, peroxyketals, hydroperoxides, peroxydicarbonates, and peroxymonocarbonates. Examples of specific peroxides include 2,2-bis(t-butylperoxy)butane, 1,3 1,4-bis(tert-butylperoxyisopropyl)benzene, dicumyl peroxide, tert-butylcumylperoxide, 2,5-dimethyl-2, 5-di-(tert-butylperoxy)hexane, n-butyl-4,4'-di(tert-butylperoxy)valerate, 1,1'-di(tert-butylperoxy)-3,3,5-trimethylcyclohexane, and the like; or inorganic peroxides such as calcium peroxide, zinc peroxide, hydrogen peroxide, peroxydisulfate salts, and the like. Commercially available peroxides include those marketed by Arkema, Inc. under the tradename DI-CUP® including, DI-CUP® dialkyl peroxide, DI-CUP® 40C as dialkyl peroxide (on calcium carbonate support), DI-CUP® 40K dialkyl peroxide, DI-CUP® 40KE dialkyl peroxide; and alkyl diperoxy compounds including 2,5-dimethyl-2,5-di(t-butylperoxy) hexane and marketed by Akzo-Nobel under the tradename TRIGONOX® 101. Effective amounts of peroxides can be readily determined by one of skill in the art depending on factors such as the reactivity of the peroxide and the polyphenylene sulfide and polyphenylsulfone, the desired degree of cure, and like considerations, and can be determined without undue experimentation. For example, peroxides can be used in amounts of about 1 to about 10 parts per 100 parts by weight of the polyphenylene sulfide and polyphenylsulfone. Sulfur can also be used for crosslinking, for example, elemental sulfur, hydrogen sulfide, or sulfur donor agents. Examples of sulfur donor agents include alkyl polysulfides, thiuram disulfides, and amine polysulfides. Some non-limiting examples of suitable sulfur donor agents are 4,4'-dithiomorpholine, dithiodiphosphorodisulfides, diethyldithiophosphate polysulfide, alkyl phenol disulfide, tetramethylthiuram disulfide, 4-morpholinyl-2-benzothiazole disulfide, dipentamethylenethiuram hexasulfide, and caprolactam disulfide. Combinations of the foregoing crosslinking agents can be used.

In another embodiment, sulfur can be used in amounts of about 1 to about 10 parts per 100 parts by weight of the polyphenylene sulfide and polyphenylsulfone composition. Sulfur can also be used for crosslinking, for example elemental sulfur or hydrogen sulfide. Combinations of the foregoing crosslinking agents can be used.

According to an embodiment, the crosslinked product includes sulfur incorporated into the crosslinks in an amount from about 0.01 wt. % to about 5 wt. %, specifically about 0.05 wt. % to about 1.5 wt. %, and more specifically about 0.09 wt. % to about 1.1 wt. % based on the weight of the polyphenylene sulfide and the polyphenylsulfone.

Other agents to initiate or accelerate cure as are known in the art can also be present, for example amine accelerators, sulfonamide accelerators, and the like. Effective amounts of crosslinking agent, activators, and the like are known in the art and can be determined without undue experimentation.

Crosslinking in the presence of a peroxide, sulfur, or other molecular crosslinking agent can be carried out at ambient pressure, at a partial pressure lower than ambient, or at elevated pressures (greater than 1 atmosphere). When peroxides, sulfur, or another gas, solid, or liquid crosslinking agent is used, the agent is generally compounded with the polyphenylene sulfide and polyphenylsulfone, which are then optionally shaped and crosslinked. The crosslinking agent can be pre-dispersed in a master batch and added to the polyphenylene sulfides and polyphenylsulfones to facilitate mixing.

Crosslinking with peroxides, sulfur, or other crosslinking agents is thermally induced and, thus, is carried out at elevated temperatures for a time and at a pressure effective to achieve the desired degree of crosslinking. For example, crosslinking is carried out at about 150° C. to about 600° C. (or higher), about 200° C. to about 500° C., or more specifically about 300° C. to about 450° C. The crosslinking is conducted for a total time of about 200 hours or less, about 72 hours or less, about 48 hours or less, or about 1 to about 48 hours. In an embodiment, crosslinking is conducted at about 300° C. to about 375° C. for about 1 to about 20 hours, specifically about 2 to about 6 hours, in air atmosphere at ambient pressure. When the polyphenylene sulfide and polyphenylsulfone combination is molded prior to crosslinking, the polyphenylene sulfide and polyphenylsulfone combination may be first molded at high temperature (e.g., 200-500° C., or 300 to 450°), followed by crosslinking as described above. If the crosslinking temperature is close to or at the thermal decomposition temperature, a combination of crosslinking temperature and time is used such that during crosslinking, the crosslinked polyphenylene sulfide and polyphenylsulfone combination exhibits a weight loss of less than 10%, specifically less than 5% weight loss, and more specifically less than 1% weight loss. According to an embodiment, the crosslinking of the polyphenylene sulfide to the polyphenylsulfone is performed at a temperature greater than the Tg of the polyphenylene sulfide. In an embodiment, the crosslinking is performed at a temperature greater than the melting temperature (Tm) of the polyphenylene sulfide. In some embodiments, the crosslinking is conducted at a temperature at or above the glass transition temperature of the crosslinked product of the polyphenylene sulfide and the polyphenylsulfone and for a time effective to provide a shape memory crosslinked polyphenylene sulfide-polyphenylsulfone, which will be further described below.

According to an embodiment, the method includes foaming a combination of the polyphenylene of formula (1) and the polyphenylsulfone of formula (4) prior to crosslinking. A further embodiment of the method includes shaping the polyphenylene of formula (1) and the polyphenylsulfone of formula (4) prior to crosslinking.

The degree of crosslinking can be regulated by controlling reaction parameters such as crosslinking temperature, crosslinking time, and crosslinking environment, for example, varying the relative amounts of the polyphenylene sulfide, polyphenylsulfone, and crosslinking agent. Degree of cure can be monitored using a number of methods. Once crosslinked, these polymers do not dissolve in solvents. In an advantageous feature, solubility can be used to examine whether or not a polymer is crosslinked. Other methods that can be used to examine molecular crosslinking include Dynamic Mechanical Analysis (DMA). This method monitors and records material modulus at different temperatures. For amorphous thermoplastic polymers, the modulus drops to near zero when the temperature is increased to above the Tg. Material tends to flow at high temperature above Tg. In contrast, crosslinked polymers will maintain a rubber-like plateau having relatively high modulus at a wide temperature range above its glass transition temperature. The crosslinked polyphenylene sulfide and polyphenylsulfone can be partially crosslinked as described above.

Crosslinking can be partial, i.e., localized, or full across the mass of the polyphenylene sulfide and polyphenylsulfone. Localized cure can be achieved based on the degree of exposure of the polyphenylene sulfides and polyphenylsulfones to the crosslinking agent (e.g., sulfur) during crosslinking. For example, where the polyphenylene sulfides and polyphenylsulfones are provided as a pellet or particle, partial cure may be obtained where only the outermost, exposed surface or layer of a particle of the crosslinked polyphenylene sulfide and polyphenylsulfone is crosslinked, while the interior of the pellet or particle is uncrosslinked. The portion crosslinked, in this instance, corresponds to the diffusion depth of the crosslinking agent into the pellet or particle during cure and varies with variation in cure condition, i.e., temperature, pressure, oxygen concentration, and time.

When polyphenylene sulfides and polyphenylsulfones are cured with, for example, sulfur, the surface of such composition may be crosslinked, but the internal portion of the materials may not be crosslinked. As a result, the material may exhibit non-uniform mechanical, chemical, and physical properties. It has been discovered that addition of a small amount of an oxidant such as magnesium peroxide will result in crosslinking for molded polyphenylene sulfide-polyphenylsulfone parts. Unlike other organic or inorganic peroxides such as dicumyl peroxide, benzoyl peroxide, zinc peroxide, calcium peroxide, etc., magnesium peroxide decomposes at much higher temperature at 350° C. and releases oxygen upon decomposition. It is also discovered herein that a small amount of sulfur will also result in crosslinking for molded polyphenylene sulfide-polyphenylsulfone parts. Full cure of a pellet, particle, or molded part thus may be more readily attained where a crosslinking agent such as a peroxide or sulfur is incorporated into the polyphenylene sulfide-polyphenylsulfone composition.

In another embodiment, the polyphenylene sulfides and polyphenylsulfones are compounded with an additive prior to crosslinking and then crosslinked. "Additive" as used herein includes any compound added to the polyphenylene sulfide and polyphenylsulfone composition to adjust the properties of the crosslinked product (that is the polyphenylene sulfide crosslinked to the polyphenylsulfone), for example a blowing agent to form a foam, a filler, or processing aid, provided that the additive does not substantially adversely impact the desired properties of the crosslinked product, for example corrosion resistance at high temperature.

Fillers include reinforcing and non-reinforcing fillers. Reinforcing fillers include, for example, silica, glass fiber, carbon fiber, or carbon black, which can be added to the polymer matrix to increase strength. Non-reinforcing fillers such as polytetrafluoroethylene (PTFE), molybdenum disulfide ($MoS_2$), or graphite can be added to the polymer matrix to increase the lubrication. Nanofillers are also useful, and are reinforcing or non-reinforcing. Nanofillers, such as carbon nanotubes, nanographenes, nanoclays, polyhedral oligomeric silsesquioxane (POSS), or the like, can be incorporated into the polymer matrix to increase the strength and elongation of the material. Nanofillers can further be functionalized to include grafts or functional groups to adjust properties such as solubility, surface charge, hydrophilicity, lipophilicity, and other properties. Silica and other oxide minerals can also be added to the composition. Combinations comprising at least one of the foregoing fillers can be used.

A processing aid is a compound included to improve flow, moldability, and other properties of the crosslinked thermoplastic material. Processing aids include, for example an oligomer, a wax, a resin, a fluorocarbon, or the like. Exemplary processing aids include stearic acid and derivatives, low molecular weight polyethylene, and the like. Combinations comprising at least one of the foregoing fillers can be used.

The polyphenylene sulfides and polyphenylsulfones can be crosslinked together alone or in the presence of another polymer in order to obtain the desired properties of the crosslinked product (polyphenylene sulfide-polyphenylsulfone). However, the presence of other polymers may reduce chemical resistance. Thus, in an embodiment, no other polymer is present during crosslinking of the polyphenylene sulfides and polyphenylsulfones. If used, in order to maintain the desired properties of the crosslinked product, any amount of the additional polymers are limited, being present for example in amount of 0.01 to 20 weight percent (wt. %), 0.1 to 10 wt. %, or 1 to 5 wt. % of the total weight of the polymers present. For example, if used, aromatic thermoplastic polymers can be present, such as aromatic polyamides, polyimides, polyetherimides, polyaryletherketones (PAEK), polyetherether ketones (PEEK), polyether sulfones (PESU), polyphenylene sulfone ureas, self-reinforced polyphenylene (SRP), or the like, or combinations comprising at least one of the foregoing. Polymers containing oxygen include, for example, acetal resins (e.g., polyoxymethylene (POM)), polyester resins (e.g., poly(ethylene terephthalate) (PET), poly(butylene terephthalate) (PBT), and poly(ethylene naphthalate) (PEN)), polyarylates (PAR), poly(phenylene ether) (PPE), polycarbonate (PC), aliphatic polyketones (e.g., polyketone (PK)), poly (ether ketones) (polyetherketone (PEK), polyetherketoneketone (PEKK), and polyetherketone etherketone ketone (PEKEKK)), and acrylic resins (e.g., polymethylmethacrylate (PMMA)) can be used. The additional polymer can be linear or branched, homopolymers or copolymers, and used alone or in combination with one or more other aromatic thermoplastic polymers. Copolymers include random, alternating, graft, and block copolymers, the block copolymers having two or more blocks of different homopolymers, random copolymers, or alternating copolymers. The thermoplastic polymers can further be chemically modified to include, for example, functional groups such as halogen, alcohol, ether, ester, amide, etc. groups, or can be oxidized, hydrogenated, and the like. A reactive elastomer or fluoropolymer can be blended with the polyphenylene sulfides and polyphenylsulfones before crosslinking, and graft to the polyphenylene sulfides and polyphenylsulfones during their crosslinking to increase flexibility of the crosslinked product. Examples of reactive elastomers or fluoropolymers include polytetrafluoroethylene (PTFE), nitrile-butyl rubber (NBR), hydrogenated nitrile-butyl rubber (HNBR), high fluorine content fluoroelastomers rubbers such as those in the FKM family and marketed under the tradename VITON® fluoroelastomers (available from FKM-Industries) and perfluoroelastomers such as FFKM (also available from FKM-Industries) and marketed under the tradename KALREZ® perfluoroelastomers (available from DuPont), and VECTOR® adhesives (available from Dexco LP), organopolysiloxanes such as functionalized or unfunctionalized polydimethylsiloxanes (PDMS), tetrafluoroethylene-propylene elastomeric copolymers such as those marketed under the tradename AFLAS® and marketed by Asahi Glass Co., ethylene-propylene-diene monomer (EPDM) rubbers, polyvinylalcohol (PVA), and the like, and combinations comprising at least one of the foregoing polymers.

Prior to crosslinking, or after partial crosslinking, the polyphenylene sulfides and polyphenylsulfones can optionally be shaped to provide a preform that is then crosslinked or further crosslinked. As described in more detail below, crosslinking renders the crosslinked product insoluble in most solvents. The high glass transitions temperatures of the crosslinked product also renders it non-thermoplastic. For some applications, therefore, it is advantageous to first shape the polyphenylene sulfide and polyphenylsulfone composition into the desired article prior to crosslinking. A variety of methods can be used to shape the polyphenylene sulfide and polyphenylsulfone composition, for example, molding, casting, extruding, foaming, and the like. Accordingly, in an embodiment, an article is manufactured by optionally compounding the polyphenylene sulfide and polyphenylsulfone composition with a crosslinking agent and one or more optional additives; shaping the optionally compounded composition to form a preform; and crosslinking the polyphenylene sulfides and polyphenylsulfones to form the article.

Alternatively, the crosslinked product can be shaped after crosslinking is complete by physical means such as cutting, grinding, or machining.

The polyphenylene sulfide and polyphenylsulfone composition can also be shaped by foaming, and then crosslinked after foaming, or after the foam is further shaped, for example by casting or molding the blown foam. For example the polyphenylene sulfide and polyphenylsulfone composition can be extruded with 1 to 10 wt. % of a chemical or physical blowing agent, such as water, an inert gas (e.g., argon or nitrogen), C1-C6 hydrochlrorofluorocarbons, C1-C6 hydrocarbons (e.g., propane or butane), C1-C5 alcohols (e.g., methanol or butanol), C1-C4 ketones (e.g., acetone), and the like. A nucleating agent can be present to regulate the size and number of cells. Alternatively, particulate water-soluble salts, for example sodium chloride, potassium chloride, potassium iodide, sodium sulfate, or other salt having a high solubility in water can be used to form pores, wherein the composition containing the salts is crosslinked, and the salts are removed after crosslinking, for example by soaking and/or extracting the salts from the crosslinked product with a suitable solvent (such as water, where a water-soluble nucleating agent is used) to form pores. In an embodiment, the foams are open cell foams where the voids in the foam are in fluid communication. Alternatively a closed cell foam can be made where the cells are not in communication. In this case, some of the cells can contain fluid. Examples of the fluid include air, inert gas, sulfur-containing compounds, oxygen-containing compounds, or a combination thereof. The fluid can be from a blowing agent or entrapment of, e.g., ambient gases in the closed cells. Alternatively, foams of the crosslinked product can be shaped after crosslinking is complete by physical means such as cutting, grinding, or machining.

In another embodiment, the polyphenylene sulfides and polyphenylsulfones can be manufactured to form shape memory materials, i.e., having thermally activated shape memory properties wherein the material is thermally activated between an actuated and unactuated shape. In this embodiment, the shape memory crosslinked product can be manufactured by optionally compounding the polyphenylene sulfide and polyphenylsulfone composition with a crosslinking agent and one or more optional additives; compacting the optionally compounded polyphenylene sulfides and polyphenylsulfones at a low temperature (e.g., 50° C. or less, or room temperature); crosslinking the compacted composition described above to form an unactuated shape; compression molding the crosslinked product at a temperature at or above the Tg of the crosslinked product to form an actuated shape of the crosslinked product; allowing the crosslinked product having the actuated shape to cool in the mold, or de-molding at a temperature at or above the Tg of the crosslinked product and allowing the crosslinked product to cool after demolding to provide a crosslinked product having an actuated shape, i.e., after de-molding the crosslinked product maintains the actuated shape since is cooled to below the Tg of the crosslinked product more rapidly than the time it takes to convert from the actuated shape to the unactuated shape. The temperature used during crosslinking the composition and the heating at or above the Tg of the crosslinked article can be the same, such that the crosslinking and the heating can be performed in the same step. The crosslinked product has thermally activated shape memory properties in that heating to at or above the Tg of the crosslinked product causes the crosslinked product to assume an unactuated shape. It is also possible to form a shape memory foam by this method, by forming a foam prior to crosslinking. In an embodiment, the Tg of the crosslinked product is intermediate between the Tg of the polyphenylene sulfide and the polyphenylsulfone.

The crosslinked product of polyphenylene sulfide crosslinked to polyphenylsulfone has a Tg higher than the polyphenylene sulfide before crosslinking with the polyphenylsulfone, for example about 5° C. or more, about 20° C. or more, about 30° C. or more, or about 10 to about 145° C. higher than the Tg of the polyphenylene sulfide before crosslinking. Thus, the crosslinked product can have a Tg of about 105° C. or higher, about 150° C. or higher, more specifically about 180° C. or higher, up to about 240° C. Such Tgs are obtained after the polyphenylene and polyphenylsulfone composition reaches the desired degree of cure, e.g., after curing at 350° C. for at least 8 hours.

The Tg of the crosslinked product can be varied by changing the ratio of the relative amounts of the polyphenylene sulfide and polyphenylsulfone in the composition.

FIG. 1 shows a graph of the Tg of the crosslinked product versus the percentage of polyphenylsulfone (PPSU) in the composition. For the data shown, the Tg of the crosslinked product is from about 100° C. for pure polyphenylene sulfide (PPS) to about 240° C. for pure polyphenylsulfone (PPSU). A best fit curve through the data has been included to show the trend in the increase of the glass transition temperature as the amount of the PPSU in the crosslinked composition increases. For the data shown in FIG. 1 and subsequent figures, the polyphenylene sulfide and polyphenylsulfone used have a repeating unit of formula (3) and formula (5), respectively. It should be appreciated that the Tg of the crosslinked product is between the Tg of the PPS and the Tg of the PPSU for composition other than pure PPS or PPSU.

As shown in FIG. 2 creating crosslinks between PPS and PPSU causes the two polymers to remain miscible at low temperature whereas non-crosslinked compositions of PPS and PPSU are not miscible. FIG. 2A shows a composition 200 of PPS 210 and PPSU 220 at room temperature below the Tg of PPS. Without being bound by theory, it is believed that heating the composition 200 allows the PPS 210 and PPSU 220 to become miscible as shown in FIG. 2B. While the PPS 210 and PPSU 220 are miscible at the elevated temperature, the composition is crosslinked so that crosslinks 230 are formed between the PPS 210 and PPSU 220 in order to make the crosslinked product 240 as shown in FIG. 2C. When allowed to cool, the non-crosslinked again becomes immiscible at temperatures such as room temperature to remain the composition as shown in FIG. 2D. As shown in FIG. 2E, when the crosslinked product 240 is cooled to a low temperature such as room temperature, the crosslinked product 240 remains crosslinked and the PPS 210 and PPSU 220 are effectively miscible in one another by virtue of the crosslinks 230.

Figure 3:
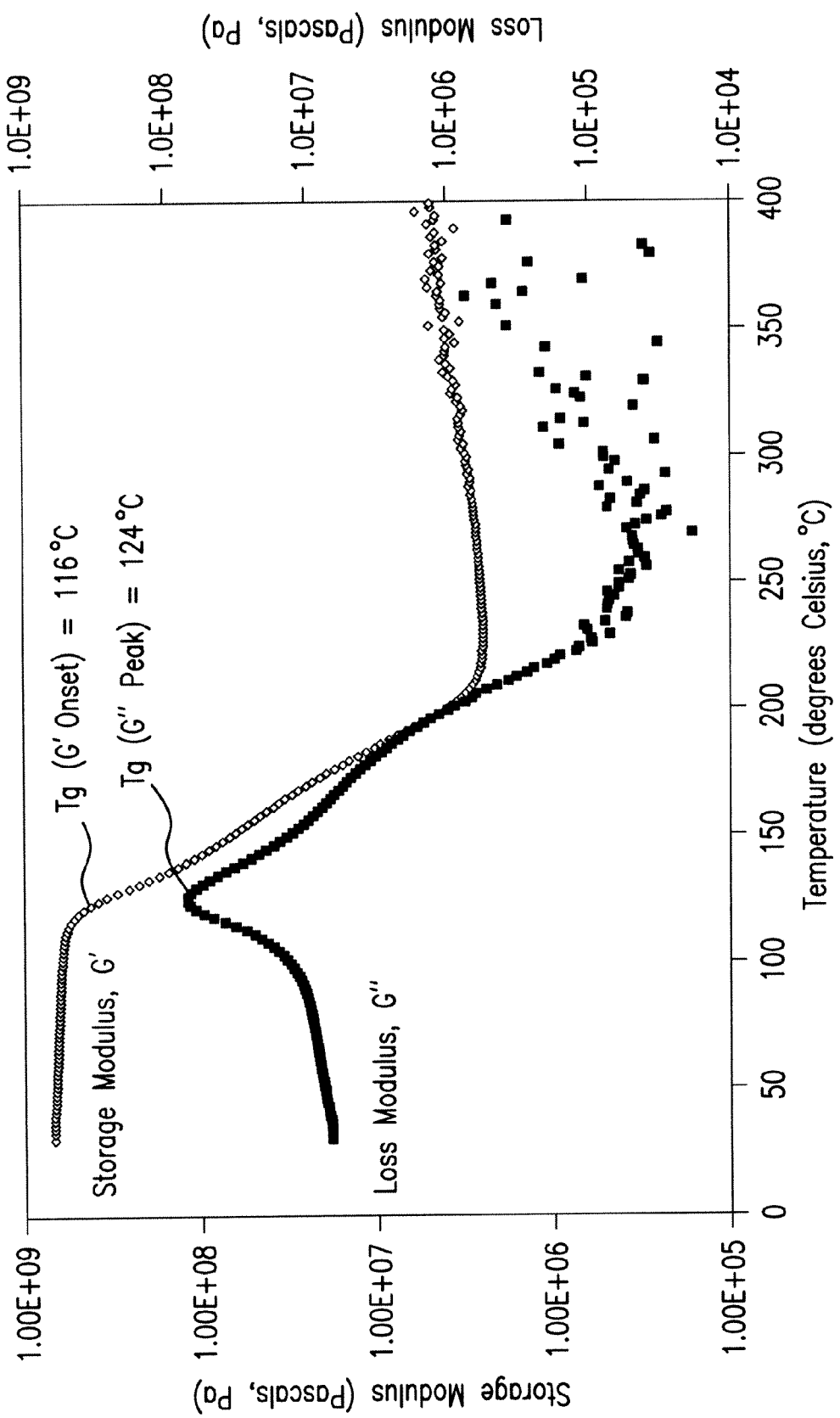
FIG. 3 shows a graph of storage modulus (Pascals, Pa.) and loss modulus versus temperature (degrees Celsius, ° C.) for a composition of PPS and PPSU with sulfur crosslinking the two polymers.

The crosslinked product (cured with, for example, 1 part sulfur at 375° C. for about 6 hours) has a storage modulus (E') of greater than about 10 megaPascals (MPa) or more, about 100 MPa or more, still more specifically about 300 MPa or more. As shown in FIG. 3, a 50/50 PPS/PPSU composition that was crosslinked by 1 part sulfur has a storage modulus of greater than 440 MPa, determined at 112° C. Moreover, the loss modulus (G") peaks at 124° C. with a value of about 36.4 MPa.

The crosslinked products, for example PPS/PPSU cured, e.g., at 350° C. for at least 8 hours, can have a thermal decomposition temperature of about 450° C. or higher, up to about 550° C.

The crosslinked products have a number of advantageous properties, particularly for use in downhole applications. In an especially advantageous feature, the chemical resistance of the polyphenylene sulfides and polyphenylsulfones is improved, and at the same time, the elastomeric properties of the polyphenylene sulfides and polyphenylsulfones are maintained after crosslinking the two together. The crosslinked product can be used continuously at high temperatures and high pressures, for example, 100 to 400° C., or 200 to 400° C. under wet conditions, including highly basic and highly acidic conditions. Thus, the crosslinked products resist swelling and degradation of properties when exposed to chemical agents (e.g., water, brine, hydrocarbons, acids such as sulfuric acid, solvents such as toluene, etc.), even at elevated temperatures of up to 400° C., and at elevated pressures (greater than atmospheric pressure) or prolonged periods. Further, the crosslinked products have excellent rubbery elasticity (elastomeric properties) at high temperature, i.e., at 350° C. as determined using dynamic mechanical analysis (DMA) (FIG. 3).

The storage modulus below the Tg of the crosslinked product as well as the rigidity of its elastomeric state above its Tg can be varied by the amount of crosslinking between the PPS and PPSU, which can be controlled at least by varying the amount of crosslinking agent, for example, sulfur. In an embodiment, the storage modulus for a 50/50 PPS/PPSU crosslinked product is from about 200 MPa to about 700 MPa at 100° C. as the amount of sulfur is varied from about 0.5 to about 10 parts sulfur in the composition before crosslinking.

Figure 4:
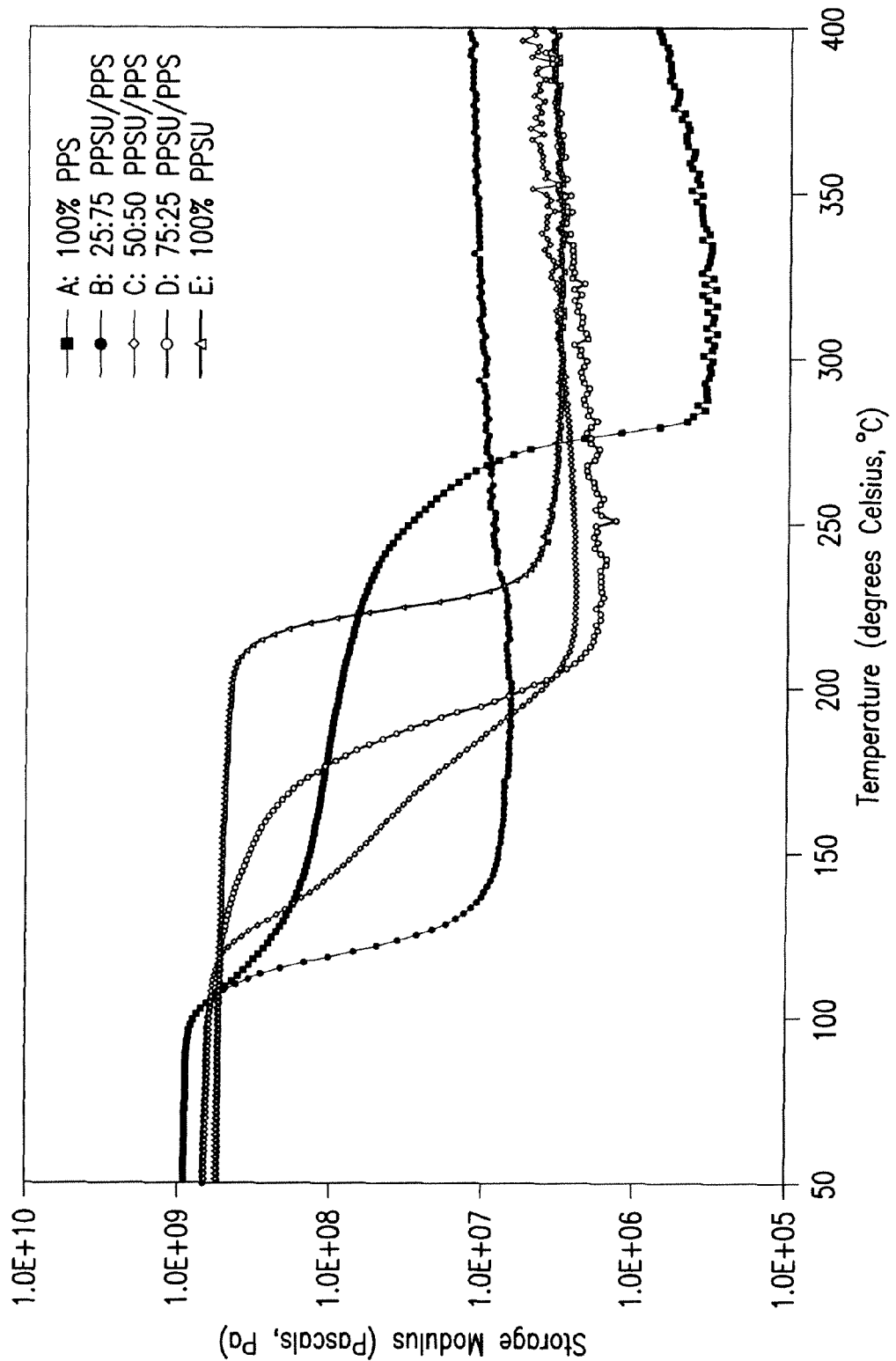
FIG. 4 shows a graph of the storage modulus (Pascals, Pa.) versus temperature (degrees Celsius, ° C.) for different ratios of PPS and PPSU in a crosslinked product of PPS/PPSU.

The Tg of the crosslinked product is variable and depends on the relative amounts of the PPS and PPSU in the crosslinked product. Referring to FIG. 4 and FIG. 1, the Tg varies from about 212° C. for a 10/90 PPS/PPSU crosslinked product to about 104° C. for a 90/10 PPS/PPSU crosslinked product.

Figure 5:
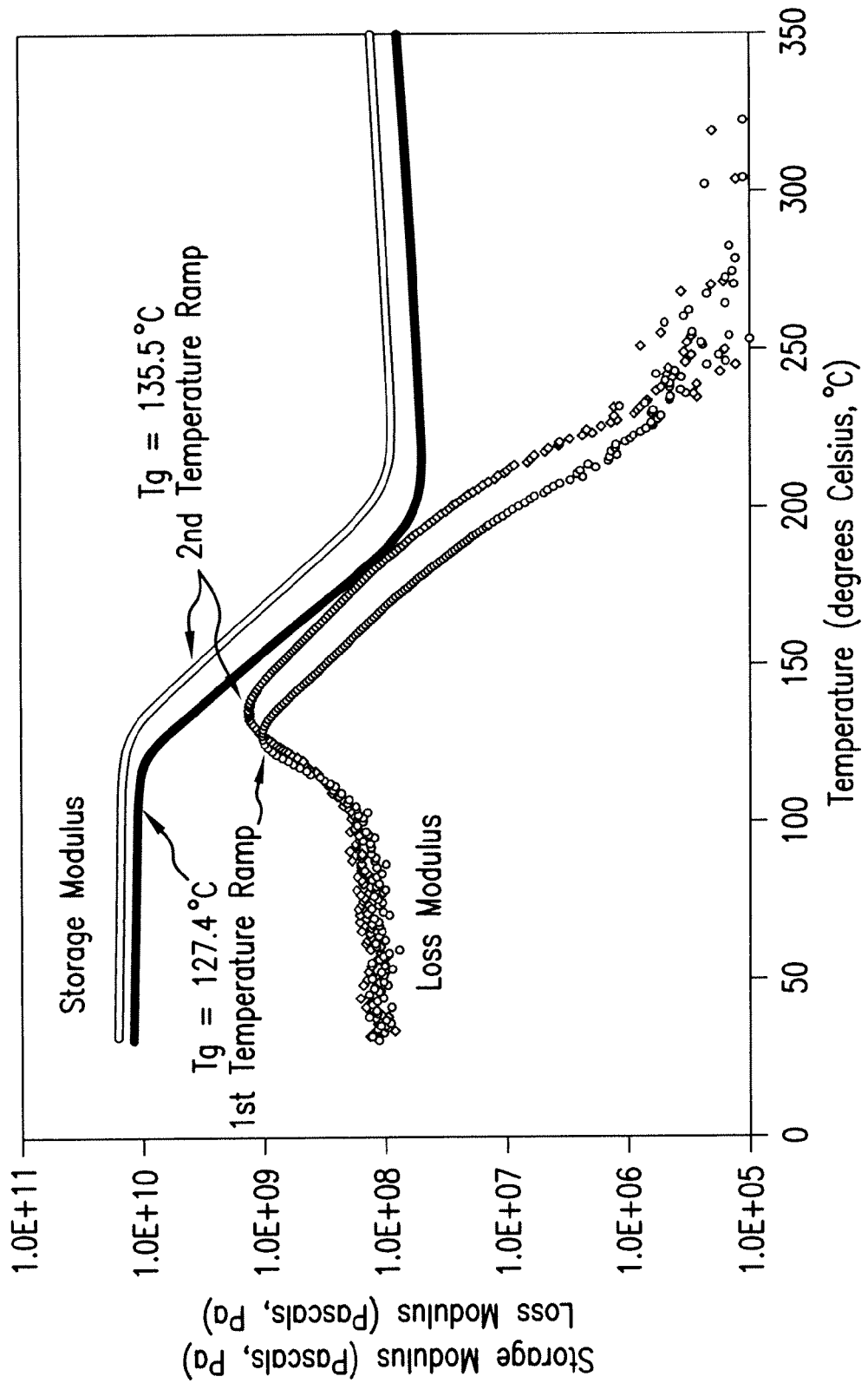
FIG. 5 shows a graph of the storage modulus (Pascals, Pa.) and loss modulus versus temperature (degrees Celsius, ° C.) for repeated measurements of the storage and loss moduli for a crosslinked product of PPS/PPSU.

Moreover the crosslinked product is thermally stable and exhibits substantially no crosslinking breakage upon subsequent heating as shown in FIG. 5, which shows multiple heating cycles for a PPS/PPSU crosslinked product that was cured with 1 part sulfur in the composition. The two storage modulus (E') curves nearly overlap and have similar shapes. Similarly, the loss modulus (G") curves nearly overlap. The shifts in the modulus curves (both E' and G") to higher temperatures during subsequent heating cycles is due to increased glass transition temperature from a Tg of 127.4° C. during the first heating to a Tg of 135.5° C. during the second heating of the crosslinked PPS/PPSU composition. This illustrates that the crosslinked product is thermally stable, and the transition glass temperature is expected to stabilize to a substantially constant value after repeated heating cycles.

In addition to excellent elastomeric properties at high temperatures, the crosslinked products have excellent chemical resistance. As discussed above, downhole articles such as sealing elements are used under harsh, wet conditions, including contact with corrosive water-, oil-and-water-, and oil-based downhole fluids at high temperature.

In a specific embodiment, it has been discovered that the crosslinked products of polyphenylene sulfide and polyphenylsulfone disclosed herein exhibit outstanding corrosion resistance, that is, retention of their original mechanical properties (such as elasticity, modulus, and/or integrated strength) after contact with highly corrosive downhole fluids (e.g., cesium acetate having pH=10 or alkaline brine with pH about 3) at temperatures as high as 250° C. or higher.

The crosslinked products are useful for preparing elements for downhole applications, such as a packer element, a blow out preventer element, a submersible pump motor protector bag, a sensor protector, a sucker rod, an O-ring, a T-ring, a gasket, a sucker rod seal, a pump shaft seal, a tube seal, a valve seal, a seal for an electrical component, an insulator for an electrical component, a seal for a drilling motor, a seal for a drilling bit, or porous media such as a sand filter, or other downhole elements. According to an embodiment, the crosslinked product is used in sealing elements for High Temperature High Pressure (HTHP) or Ultra High Temperature High Pressure (UHTHP) applications since the crosslinked product has high thermal stability and a high decomposition temperature.

In an embodiment, a downhole seal, e.g., a packer element, includes a crosslinked product of PPS/PPSU as described above. In an embodiment, the downhole seal is made by molding a crosslinked product to form a preform; and crosslinking the preform to form the downhole seal.

In a specific embodiment the article, for example the downhole seal, can be a shape memory seal manufactured using the methods described above, for example by compression molding the PPS and PPSU, optionally compounded with a crosslinking agent or an additive; heating at a temperature that is at or above the Tg of the crosslinked product and that is effective to crosslink the PPS to the PPSU; and demolding the seal at a temperature at or above the Tg of the crosslinked product to provide the shape memory seal having a first shape. In use, the seal is first installed at low temperature (e.g., at room temperature or below the Tg of the crosslinked product) and thus having its first shape; downhole, the seal is exposed to temperatures at or above the Tg of the crosslinked product, and thus assumes a second shape, for example a shape that effectively seals or occludes. Of course, other shape memory articles for downhole use can also be manufactured using this general method.

Alternatively, the elements can be manufactured from the crosslinked product by preparing the crosslinked product in particle or bulk form; comminuting the bulk form to particulates; optionally compounding the particulates with an additive; and forming the element from the compounded particulates, for example by molding, extrusion, or other methods. Comminuting the bulk crosslinked product of PPS/PPSU can be by any method, for example use of a mortar and pestle, ball mill, grinder, or the like, provided that the particle size of the resultant polymer is suitable for adequate mixing. The particle size is not particularly limited, for example the crosslinked product is produced or comminuted to a particle size of about 10 mesh or less, about 20 mesh or less, or about 40 mesh or less. The particles can be compounded with additional crosslinking agents, any of the additives described above, or other additives ordinarily used for the intended element.

In a specific embodiment, particles are used to form shape memory articles. In this process, a shape memory article is manufactured by preparing the crosslinked product of PPS/PPSU prepared in particle or bulk form; comminuting the bulk form to provide particulates; optionally compounding the particulates with an additive; compression molding the optionally compounded particulates at a temperature at or above the Tg of the crosslinked product (for example, greater than about 180° C., or about 200 to about 300° C.) to form the article; and cooling the article in the mold or removing the article from the mold at or above the Tg of the crosslinked product and allowing it to cool.

Figure 6:
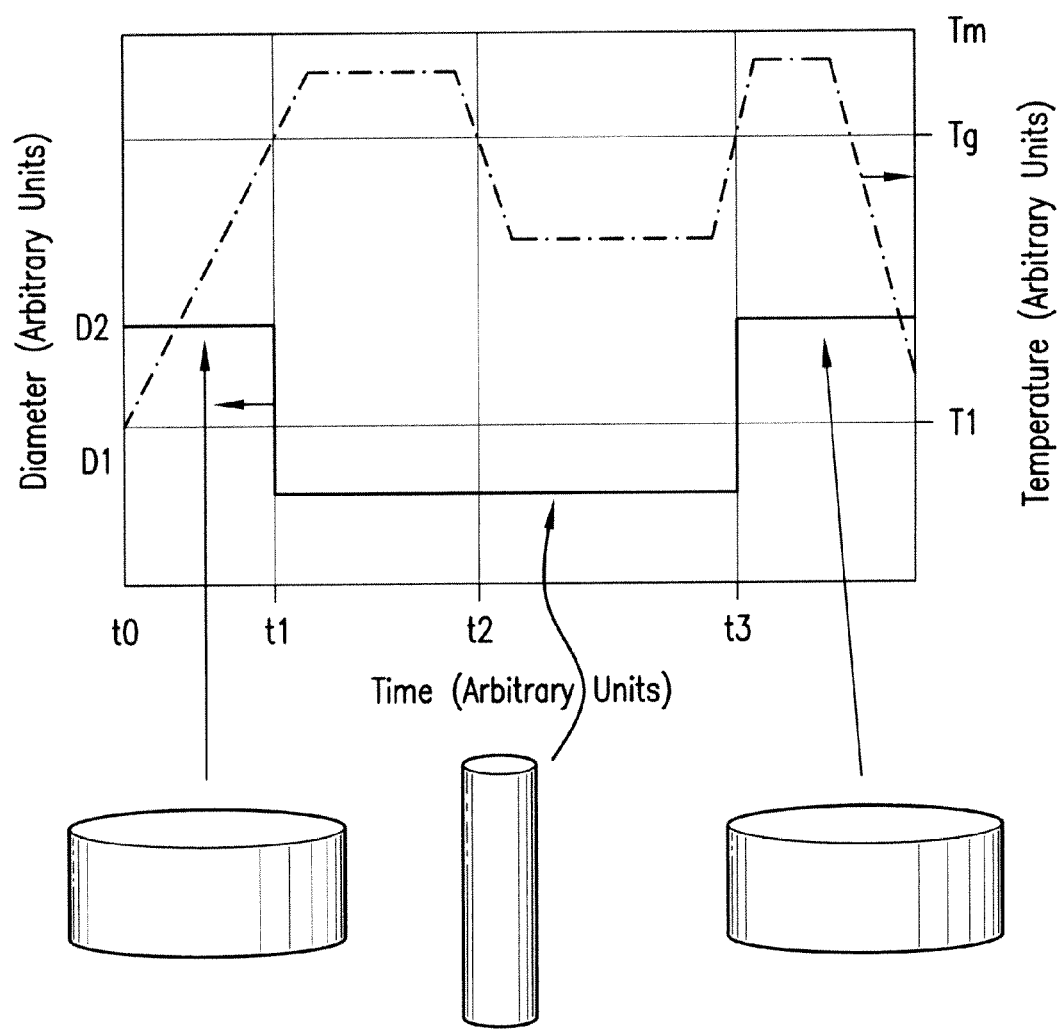
FIG. 6 shows a graph of the diameter and temperature profile versus time for a downhole article made of a crosslinked PPS-PPSU composition.

FIG. 6 shows a graph of the diameter and temperature profile versus time for a downhole article made of a crosslinked product of PPS-PPSU. Here, a packer starts out at time t0 and temperature T1 with a large diameter D2 and short height (an unactuated shape), which is less than the glass transition temperature Tg of the crosslinked product which makes up the packer. The temperature increases from T1 to greater than Tg at time t2 where the packer is mechanically deformed in a mold to have a smaller diameter D1 in an actuated shape. The packer is cooled below its Tg and demolded at time t2 at which point the packer is placed downhole in the actuated (where the diameter D1 of the packer is less than the diameter of the borehole). In the downhole environment, the temperature is increased to greater than the Tg of the packer at time t3, and the packer is deployed to the unactuated shape with diameter D2, thus sealing the borehole.

The use of the terms "a," "an," "the," and similar referents in the context of the description and the claims are to be construed to cover both the singular and the plural, unless otherwise indicated herein or clearly contradicted by context. The terms "first," "second," and the like herein do not denote any order, quantity, or importance, but rather are used to distinguish one element from another. All ranges disclosed herein are inclusive of the endpoints, and the endpoints are independently combinable with each other.

As used herein, "combination" is inclusive of blends, mixtures, alloys, reaction products, and the like. "Elastomer" as used herein is a generic term for substances emulating natural rubber in that they stretch under tension, have a high tensile strength, retract rapidly, and substantially recover their original dimensions. The term includes combinations (physical mixtures) of elastomers, as well as copolymers, terpolymers, and multi-polymers.

While one or more embodiments have been shown and described, modifications and substitutions may be made thereto without departing from the spirit and scope of the invention. Accordingly, it is to be understood that the present invention has been described by way of illustrations and not limitation.

What is claimed is:

1. A composition comprising:
   a crosslinked product of a polyphenylene sulfide and a polyphenylsulfone.

2. The composition of claim 1, wherein the polyphenylene sulfide has a structure of formula (1)

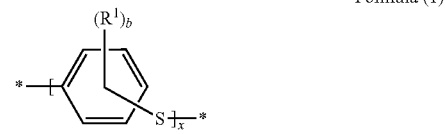

Formula (1)

wherein
   R1 is a substituent on the phenyl group, wherein each R1 is independently hydrogen, halogen, alkyl group, alkoxy group, haloalkyl group, cycloalkyl group, heterocycloalkyl group, cycloalkyloxy group, aryl group, aralkyl group, aryloxy group, aralkyloxy group, heteroaryl group, heteroaralkyl group, alkenyl group, alkynyl group, amine group, amide group, alkyleneamine group, aryleneamine group, or alkenyleneamine group, nitro, cyano, carboxylic acid or a salt thereof, phosphonic acid or a salt thereof, or sulfonic acid or a salt thereof;
   b is an integer from 0-4, provided that the valence of the phenyl group is not exceeded; and
   x is greater than about 10.

3. The composition of claim 2, wherein the polyphenylene sulfide is of
formula (2)

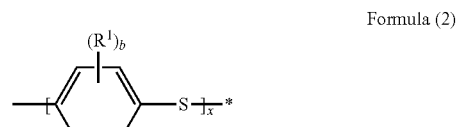

Formula (2)

wherein
   each R1 is the same or different, and is as defined in formula (1),
   b is as defined in formula (1), and
   x is as defined in formula (1).

4. The composition of claim 3, wherein the polyphenylene sulfide is of formula (3)

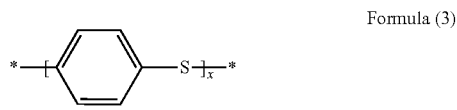

Formula (3)

wherein x is as defined in formula (2).

5. The composition of claim 1, wherein the polyphenylsulfone is of formula (4)

Formula (4)

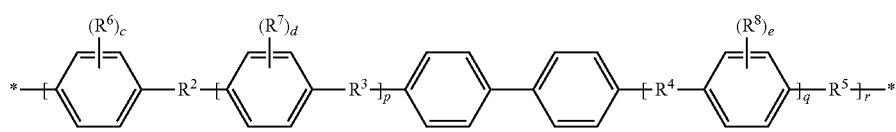

wherein
- each R2, R3, R4, R5 are independently —O— or —SO$_2$—, wherein at least one of R2 to R5 is —SO$_2$—, and at least one of R2 to R5 is —O—;
- each R6, R7, and R8 is a substituent on a phenyl group, and each R6, R7, and R8 is independently hydrogen, halogen, alkyl group, alkoxy group, haloalkyl group, cycloalkyl group, heterocycloalkyl group, cycloalkyloxy group, aryl group, aralkyl group, aryloxy group, aralkyloxy group, heteroaryl group, heteroaralkyl group, alkenyl group, alkynyl group, amine group, amide group, alkyleneamine group, aryleneamine group, or alkenyleneamine group;
- c, d, and e are integers which are each independently 0-4, provided that the valence of the phenyl group is not exceeded;
- p and q are integers which are independently 0 or 1; and
- r is an integer which is greater than about 10.

6. The composition of claim 5, wherein the polyphenylsulfone includes at least 50% of a first repeating unit of formula (5), based on the total number of repeat units in the polyphenylsulfone Formula (5)

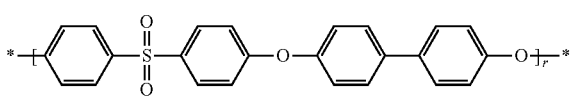

wherein r is an integer greater than about 10.

7. The composition of claim 6, wherein the polyphenylsulfone includes a second repeating unit of formula (6), formula (7), formula (8), formula (9), or a combination thereof

8. The composition of claim 6, wherein the polyphenylsulfone is a copolymer of formula (5) and formula (10), formula (11), formula (12), or a combination thereof Formula (10)

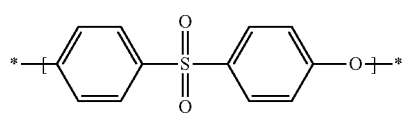

Formula (11)

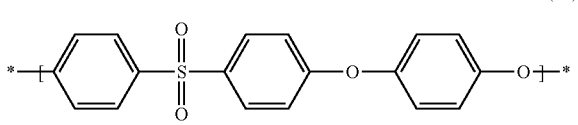

Formula (12)

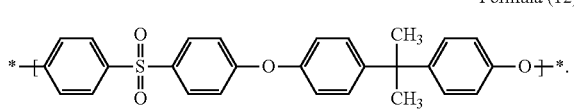

9. The composition of claim 1, wherein the crosslinked product has a Tg equal to or greater than the Tg of the polyphenylene sulfide.

10. The composition of claim 1, wherein the Tg of the crosslinked product is greater than the Tg of the polyphenylene sulfide and less than the Tg of the polyphenylsulfone.

11. The composition of claim 10, wherein the Tm of the crosslinked product is greater than the Tg of the polyphenylsulfone.

12. The composition of claim 1, wherein the polyphenylene sulfide and the polyphenylsulfone are miscible together.

13. The composition of claim 1, wherein the crosslinked product has a Tg from about 110° to about 225° C.

Formula (6)

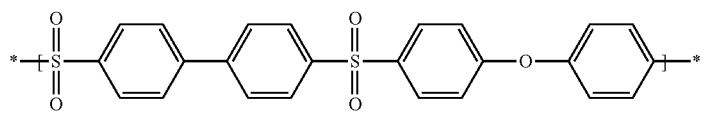

Formula (7)

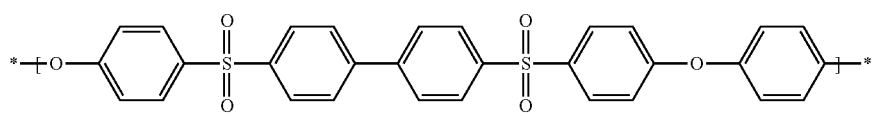

Formula (8)

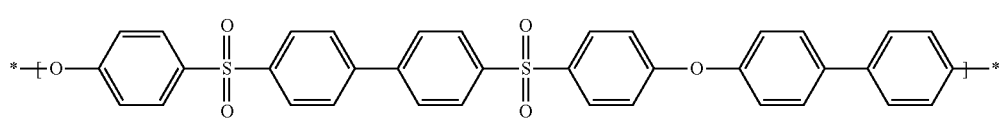

Formula (9)

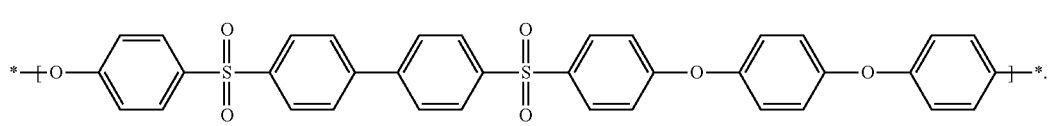

14. The composition of claim 1, wherein the crosslinked product has a storage modulus greater than about 150 MPa at a temperature of 100° C.

15. The composition of claim 1, wherein, in the crosslinked product, the weight ratio of the amount of polyphenylene sulfide to the amount of polyphenylsulfone is from about 1:99 to about 99:1.

16. The composition of claim 1, wherein the crosslinked product includes sulfur incorporated into the crosslinks in an amount from about 0.09 wt. % to about 1.1 wt. % based on the weight of the polyphenylene sulfide and the polyphenylsulfone.

17. The composition of claim 1, further comprising a reinforcing filler.

18. The composition of claim 1, wherein the reinforcing filler comprises silica, glass fiber, carbon fiber, carbon black, nanotubes, nanographenes, nanoclay, polyhedral oligomeric silsesquioxane (POSS), plasticizer, or a combination thereof.

19. The composition of claim 1, further comprising a thermoplastic polymer selected from a polyamide, polyimide, polyetherimide, polyaryletherketones, polyetheretherketone, polyethersulfone, self-reinforced polyphenylene, or a combination thereof.

20. The composition of claim 19, wherein the thermoplastic polymer is crosslinked to the crosslinked product.

21. The composition of claim 1, in the form of a foam.

22. The composition of claim 21, further comprising a reinforcing filler.

23. The composition of claim 22, wherein the reinforcing filler comprises silica, glass fiber, carbon fiber, or carbon black, nanotubes, nanographenes, nanoclay, polyhedral oligomeric silsesquioxane (POSS), plasticizer, or a combination thereof.

24. The composition of claim 1, wherein the crosslinked product is a shape memory material thermally activated between an actuated and unactuated shape.

25. A method for the manufacture of the crosslinked product of a polyphenylene sulfide and a polyphenylsulfone of claim 1, the method comprising:
heating the polyphenylene sulfide and the polyphenylsulfone in presence of a crosslinking agent at a temperature and for a time effective to form the crosslinked product of polyphenylene sulfide and polyphenylsulfone.

26. The method of claim 25, wherein heating comprises increasing the temperature to greater than the Tm of the polyphenylene sulfide.

27. The method of claim 26, wherein the increasing the temperature is to a temperature from about 300° C. to about 375° C. for about 1 to about 200 hours.

28. The method of claim 26, further comprising, after the time effective to form the crosslinked product, cooling the crosslinked product to room temperature.

29. The method of claim 25, wherein the crosslinking agent is a peroxide, sulfur, metal oxide, sulfur donor agent, or a combination thereof.

30. The method of claim 25, comprising foaming a combination of the polyphenylene sulfide of formula (1) and the polyphenylsulfone of formula (4) prior to crosslinking.

31. The method of claim 25, comprising shaping the polyphenylene sulfide of formula (1) and the polyphenylsulfone of formula (4) prior to crosslinking.

32. The method of claim 25, wherein the crosslinking is conducted at a temperature at or above the glass transition temperature of the crosslinked product of the polyphenylene sulfide and the polyphenylsulfone and for a time effective to provide a shape memory crosslinked polyphenylene sulfide-polyphenylsulfone.

33. A downhole article comprising the crosslinked product of a polyphenylene sulfide and polyphenylsulfone of claim 1.

34. The downhole article of claim 33, further comprising a reinforcing filler.

35. The downhole article of claim 33, wherein the crosslinked product of polyphenylene sulfide and polyphenylsulfone is a foam.

36. The downhole article of claim 35, wherein the foam is an open cell foam.

37. The downhole article of claim 33, further comprising a reinforcing filler.

38. The downhole article of claim 33, wherein the crosslinked product is a shape memory material thermally activated between an actuated and unactuated shape.

39. A method of forming a downhole article, the method comprising:
forming a preform of the downhole element comprising the polyphenylene sulfide and polyphenylsulfone of claim 1; and
heating the preform at a temperature and for a time in presence of a crosslinking agent effective to crosslink the polyphenylene sulfide with the polyphenylsulfone to provide the article.

40. The method of claim 39, further comprising forming a foam of a combination of the polyphenylene sulfide and polyphenylsulfone and forming the preform with the foam.

41. The method of claim 39, further comprising crosslinking at a temperature at or above the glass transition temperature of the crosslinked polyphenylene sulfide-polyphenylsulfone for a time effective to provide a shape memory crosslinked polyphenylene sulfide-polyphenylsulfone.

42. A method of forming a downhole article, the method comprising:
forming particles comprising the crosslinked product of claim 1; and
shaping the particles to provide the article.

43. The method of claim 42, wherein forming the particles comprises:
heating the polyphenylene sulfide and polyphenylsulfone of claim 1 at a temperature and for a time in presence of a crosslinking agent effective to crosslink the polyphenylene sulfide with the polyphenylsulfone to provide the crosslinked product in bulk; and
comminuting the bulk crosslinked product to provide the particles.

* * * * *